United States Patent von der Crone et al.

[11] 3,867,404
[45] Feb. 18, 1975

[54] NEW ISOINDOLINONE PIGMENTS AND PROCESS FOR THEIR MANUFACTURE

[75] Inventors: Jost von der Crone, Riehen; Ernst Model, Basle; Andre Pugin, Riehen, all of Switzerland

[73] Assignee: Ciba-Geigy Corporation, Ardsley, N.Y.

[22] Filed: Jan. 15, 1978

[21] Appl. No.: 323,685

[30] Foreign Application Priority Data
Jan. 17, 1972  Switzerland.......................... 618/72

[52] U.S. Cl. ...... 260/325 PH, 260/240 G, 260/165, 260/308 B, 260/305
[51] Int. Cl. ............................................ C07d 27/50
[58] Field of Search......... 260/325, 165, 240, 308 B

[56] References Cited
UNITED STATES PATENTS
3,758,497   9/1973   Pugin et al.......................... 260/325

Primary Examiner—Joseph A. Narcavage
Attorney, Agent, or Firm—Vincent J. Cavalieri

[57] ABSTRACT

Isoindolinones of the formula

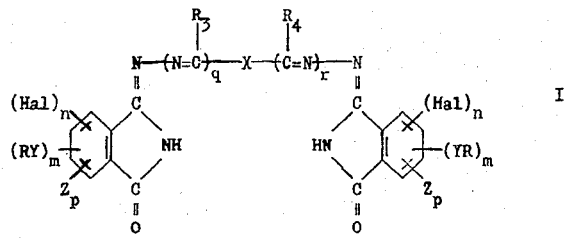

wherein Hal denotes a chlorine or bromine atom, X denotes a direct bond or a carbocyclic or heterocyclic aromatic radical, Y denotes an oxygen or sulphur atom, $R_3$ and $R_4$ denote hydrogen lower alkyl or aryl radicals and R denotes a hydrogen atom or a lower alkyl, lower cycloalkyl, aralkyl or aryl group, Z denotes a hydrogen atom, n denotes the number 0 to 3, m denotes the number 1 to 4, p denotes the number 0 to 2 and q and r denote the numbers 0 or 1, with the sum of $n+m+p$ being at most 4 are valuable pigments for solering plastics and lacquers in yellow to orange shades of outstanding fastness properties.

10 Claims, No Drawings

NEW ISOINDOLINONE PIGMENTS AND PROCESS FOR THEIR MANUFACTURE

It has been found that new valuable isoindolinone pigments of the formula

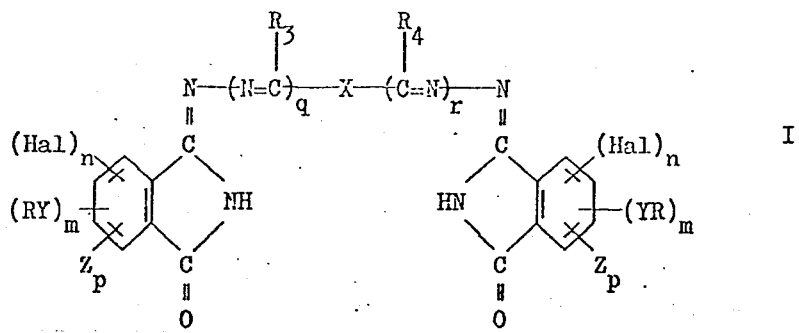

wherein Hal denotes a chlorine or bromine atom, X denotes a direct bond or a carbocyclic or heterocyclic aromatic radical, $R_3$ and $R_4$ denote hydrogen atoms or alkyl or aryl radicals, Y denotes an oxygen or sulphur atom, R denotes a hydrogen atom or an alkyl, cycloalkyl or aryl group which is optionally substituted, for example by alkoxy, aryloxy, cycloalkyl, aryl or heterocyclic radicals, Z denotes a hydorgen atom, n denotes the number 0 to 3 $m$ denotes the number 1 to 4, , $p$ denots the number 0 to 2 and $r$ and $q$ denote 0 or 1, with the sum of the n+m+p+ being at most 4, are obtained if a diamine of the formula

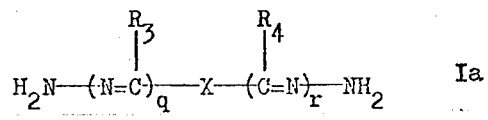

is condensed in the molar ratio of 1:2 with an isoindolinone of the formula

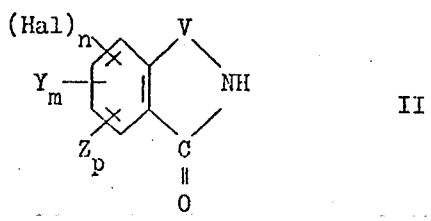

wherein V denotes a group of the formula

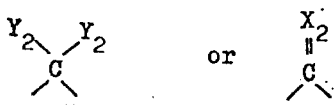

wherein $X_2$ denotes an imino or thio group and $Y_2$ denotes a halogen atom, a lower alkoxy group or a secondary amino group.

The dyestuffs according to the invention preferably correspond to the formulae

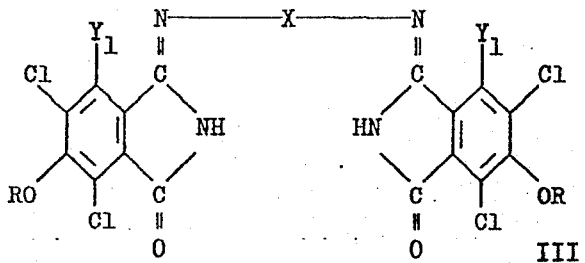

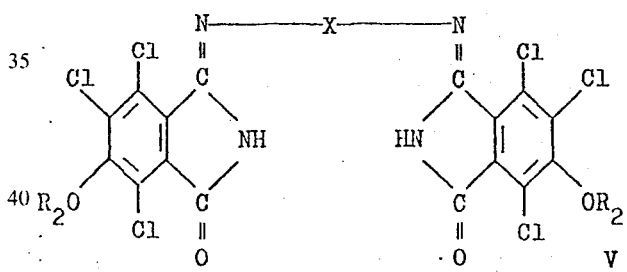

wherein $Y_1$ denotes a chlorine atom or the —OR group, and $R_2$ and X have the indicated meaning, and especially of the formula wherein X has the indicated meaning and $R_2$ denotes a lower alkoxy group.

The isoindolinones to be used as starting substances contain, in the 2-position, an imino or thio grup, 2 halogen atoms, 2 tertiary amino groups, for example piperidino or morpholino groups, or especially 2 lower alkoxy groups, preferably methoxy groups.

The isoindolinones preferably correspond to the formula

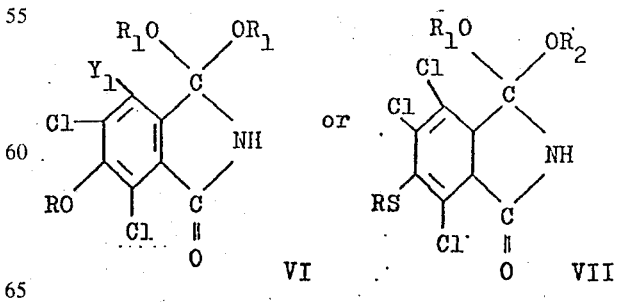

and especially to the formula

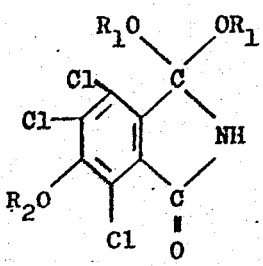

VIII with R and Y₁ in the indicated formulae having the indicated meaning and $R_1$ and $R_2$ denoting lower alkoxy groups.

The 3,3-dialkoxy-isoindolinones are obtained according to a known process by reaction of a o-cyanobenzoic acid alkyl ester of the formula

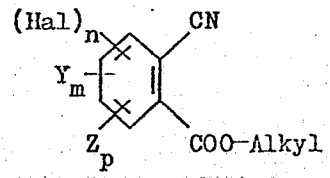

IX with an alkali alcoholate solution in a lower alcohol. As a rule it is not necessary to isolate the isoindolinone thus obtained which can, in most cases, be employed directly for the reaction with the diamine.

The 3-imino-isoindolinones are obtained according to a known process by reaction of an o-cyano-benzoic acid alkyl ester of the formula IX with ammonia.

The o-cyanobenzoic acid alkyl esters are in turn obtained in accordance with the process laid down in Patent application Ser. No. 323,686, filed Jan. 15, 1973, by reaction of the ammonium salt of a tetrahalogeno- or dihalogeno-o-cyanobenzoic acid with alkali alcoholates, alkali phenolates or alkali mercaptides and esterifciation of the reaction product with a dialkyl sulphate.

In the diamines of the formula Ia which also serve as starting substances X denotes, in the simplest case, a direct bond. X can als represent a carbocyclic or heterocyclic aromatic radical, especially a divalent aromatic radical possessing at most two benzene nuclei.

Where a bicyclic divalent aromatic radical is concerned, the two benzene radicals can be bonded to one another by a direct bond or a bridge. Possible bridges are, for example, sulphur or oxygen atoms, imino groups and the atomic groupings of the formulae —NH—CO—, —NH—CO—NH—, —CH=CH— and —N=N—.

As examples of bicyclic diamines of which the benzene radicals are bonded directly to another there may be mentioned the diaminodiphenyls, especially those of formula

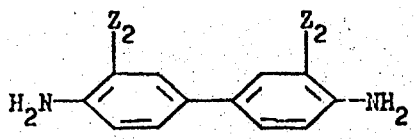

XI wherein $Z_2$ denotes a hydrogen or halogen atom or an alkyl or alkoxy group containing 1 to 4 carbon atoms.

Amongst the series of the diamines of which the benzene radicals are bonded to one another via a bridge there may especially be mentioned those of the formula

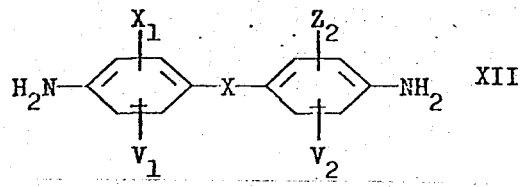

XII wherein $X_1$, $V_1$, $V_2$ and $Z_2$ denote hydrogen or halogen atoms, alkyl or alkoxy groups containing 1 to 4 carbon atoms and X denotes a sulphur atom or a group of the formulae —NH—CO—, —NH—CO—NH—, —CH=CH— or —N=N—.

Diaminopyrenes, diaminofluorenes, diaminochrysenes, diaminonaphthalenes, diaminopyrenes or diaminofluoranthenes may be mentioned as further examples of polycyclic diamines.

Finally there may also be mentioned heterocyclic diamines such as diaminopyridines, diaminophenylene oxides, diaminodiphenylene sulphones, diaminocarbazoles, diaminobenzimidazoles, diamino-bis-imidazoles, diamino-di-benzimidazolyls or diaminobenzthiazoles.

Finally it is also possible to use, as diamines, dihydrazones of dialdehydes or diketones of hydrazones of aminoaldehydes or aminoketones.

The phenylenediamines are of particular interest, especially those of the formula

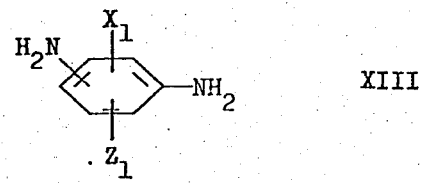

XIII wherein $X_1$ has the indicated meaning and $Z_1$ denotes a halogen atom, an alkyl or alkoxy group containing 1 to 4 carbon atoms or a phenylazo group.

The following diamines may be mentioned as examples: hydrazine, 1,4-diaminobenzene, 1,3-diaminobenzene, 1,3-diamino-4-methylbenzene, 1,3-diamino-4-methoxybenzene, 1,3-diamino-2-methylbenzene, 1,3-diamino-2,5-dichlorobenzene, 1,4-diamino-2chlorobenzene, 1,4-diamino-2-bromobenzene, 1,4-diamino-2,5-dichlorobenzene, 1,4-diamino-2-methylbenzene, 1,4-diamino-2,5-dimethylbenzene, 1,4-diamino-2-methoxybenzene, 1,-4-diamino-2,5-dimethoxybenzene, 1,4-diamino-2-chloro-5-methylbenzene, 1,4-diamino-2-chloro-5-methoxybenzene, 1,4-diamino-2-chloro-5ethoxybenzene, 1,4-diamino-2,5-diethoxybenzene, 4,4'-diamino-diphenyl, 4,4'-diamino-3,3'-dichlorodiphenyl, 4,4'-diamino-3,3'-dimethyldiphenyl, 4,4'-diamino-3,3'-dimethoxydiphenyl, 4,4'-diamino-3,3'-diethoxydiphenyl, 2,2'-diamino-diphenyl, 4,4'-diamino-dephenylsulphide, 4,4'-diamino-benzoylaniline, 4,4'-diamino-2-ethoxy-benzoylaniline, 3,3'-diamino-2,2'-dimethoxy-benzoylaniline, 4,4'-diamino-diphenylurea, 4,4'-diamino-3,3'-dimethoxy-diphenylurea, 4,4'-diaminostilbene, 4,4'-diaminoazobenzene, 2-methyl-4,4'-diaminoazobenzene, 2-methoxy-4, 4'-diaminoazobenzene, 2,5-dimethyl-4,4'-diaminoazobenzene, 2,5,2'-trimethyl-4,4'-diaminoazobenzene, 3-methyl-2'-methoxy-4,4'-diaminoazbenzene, 3-chloro-2'-methyl-4,4'-diaminoazobenzene, 4-chloro-3,4'- diaminoazobenzene, 2-chloro-4,3'-diaminoazobenzene, 2-methyl-4,3'-diaminoazobenzene, 2-methoxy-4,3'-diaminoazobenzene, 2,4-diaminoazobenzene, 5-methoxy-2,4-diaminoazobenzene, 2,4-diamino-3',5'-dimethyl-4'-acetylaminoazobenzene, 2,4-diamino-5-methoxy-3',5'-dichloro-4'-acetylaminoazobenzene, 4,-4'-diamino-phenyl-1-azo-naphthalene-1', 4,4'-diaminobenzophenone, 4,4'-diaminodiphenyl ether, 4,4'-diaminodiphenylmethane, 2,2'-diaminodibenzyl, 1,4-diaminonaphthalene, 1,5-diaminonaphthalene, 2,7-diaminofluorene, 4,11-diaminofluoranthene, 3,8-diaminopyrene, 2,8-diaminochrysene, 2,6-diaminopyridine, 2,6-diaminocarbazole, 3,6-diaminodiphenylene oxide, 2,7-diaminodiphenylene oxide, 2,6-diaminodiphenylene oxide, 2,7-diaminodiphenylene sulphone, 2,6-diaminobenzthiazole, 2-(4'-aminophenyl)-6-amino-benzthiazole, terephthalaldehyde-dihydrazone, 4,4'-diphenyl-dialdehyde-dihydrazone, 2,5-thiophenedialdehyde-dihydrazone, 1,4-diacetylbenzene-dihydrazone, 4-aminobenzaldehyde-hydrazone, 4-aminoacetophenone-hydrazone, 4-aminobenzophenone-hydrazone, 4,-amino-4'methylbenzophenone-hydrazone, glyoxal-dihydrazone and diacetyl-dihydrazone.

The condensation in part already takes place in the cold, if necessary on warming the intimately mixed components, and particularly advantageously in the presence of inert organic solvents, that is to say solvents which do not participate in the reaction.

If starting from 3-imino-, 3-thio- or 3,3-bis-tert.-amino-isoindolin-1-ones or from alkali metal salts of the 3,3'-dialkoxy-isoindolin-1-ones organic solvents which are miscible with water are advantageously used, for example lower aliphatic alcohols, such as lower alkanols, for example methanol, isopropanol or butanol, lower cyclic ethers, such as dioxane, ethylene glycol monomethyl ether and lower aliphatic ketones, such as acetone, Here, the condensation already takes place at relatively low temperatures. The reaction is advantageously carried out in the presence of agents which bind bases; as examples of such agents there may be mentioned lower fatty acids which can then simultaneously serve as solvents, especially acetic acid.

When using 3,3-dihalogeno-isoindolin-1-ones organic solvents which are free of hydroxyl groups are preferred, such as hydrocarbons, for example aromatic hydrocarbons, such as benzene, toluene, xylene, tetrahydronaphthalene or diphenyl, or cycloaliphatic hydrocarbons, for example cyclohexane, but also halogenated hydrocarbons, such as aliphatic halogenated hydrocarbons, for example carbon tetrachloride or tetrachloroethylene, or aromatic halogenated hydrocarbons, such as chlorobenzene or dichlorobenzenes and trichlorobenzenes, also aromatic nitro-hydrocarbons, such as nitrobenzene, ethers, namely aliphatic ethers, such as dibutyl ether, aromatic ethers, such as diphenyl ether, or cyclic ethers, such as dioxane, and also ketones, such as acetone, or esters, especially esters of lower fatty acids with lower alkanols, such as ethyl acetate, in the presence of acid-binding agents.

The new pigment precipitates from the reaction medium immediately after it has formed. For certain purposes it can be used directly as the crude pigment; however it is advantageous to condition it, according to methods which are in themselves known, before it is used, for example by extraction with organic solvents or by grinding with grinding auxiliaries which can subsequently be removed again, for example salts or especially hexachloroethane, or by alkaline reprecipitation. In this way the purity, tinctorial strength and transparency can be improved yet further.

The new dyestuffs are valuable pigments which in a finely divided form can be used for pigmenting high molecular organic material, for example cellulose ethers and cellulose esters, such as ethylcellulose, acetyl-cellulose or nitrocellulose, polyamides, polyurethanes or polyesters, natural resins or synthetic resins, for example aminoplasts, especially thermoplastic and curable acrylic resins, urea-formaldehyde and melamine-formaldehyde resins and also alkyd resins, phenoplasts, polycarbonates, polyolefines, such as polystyrene, polyvinyl chloride, polyethylene, polypropylene, polyacrylonitrile, polyacrylic acid esters, rubber, casein, silicone and silicone resins, individually or as mixtures. Here it does not matter whether the high molecular compounds mentioned are in the form of plastic masses or melts or in the form of spinning solutions, lacquers, paints or printing inks. Depending on the end use it proves advantageous to use the new pigments as toners or in the form of preparations. The new pigments are distinguished by high fastness, especially by outstanding fastness to light, migration and weathering.

EXAMPLE 1

7.9 g of 3-imino-4,5,7-trichoro-6methylmercaptoisoindolin-1-one and 1.35 g. of p-phenylenediamine in 100 ml of glacial acetic acid are heated to the reflux temperature for ½hour. The pigment formed is filtered off hot and washed with methanol and water. After drying, 7.5 g of a yellowish-tinged orange pigment, which can be employed for pigmenting lacquers and plastics, are obtained. The fastness to migration and to light is outstanding.

EXAMPLE 2

If instead of the methylmercapto compound 10.2 g of 3-imino-4,5,7-trichloro-6-phenoxy-isoindolin-1-one are used, a strongly coloured yellow pigment is obtained, which also shows very good fastness to migration and to light.

EXAMPLE 3

18 g of 3,3,6-trimethoxy-4,5,7-trichloro-iso-indolin-1-one and 4.9 g of 3,6-diaminodiphenylene oxide in a mixture of 100 ml of glacial acetic acid and 100 ml of o-dichlorobenzene are heated to the reflux temperature for 1 hour. The insoluble dyestuff is filtered off at 100°C and washed with methanol, acetone and water. After drying, 17 g of a pigment which is distinguished by a pure medium yellow shade and is fast to migration in PVC and outstandingly fast to light in lacquers are obtained.

EXAMPLE 4

15.5 g of 3,4,6-trichloro-5-methoxy-o-cyanobenzoic acid methyl ester are stirred with 70 ml of methanol and 8.8 g of a 30.6 percent strength solution of sodium methylate in methanol for ½ hour. The sodium salt of 3,3,6-trimethoxy-4,5,7-trichloroisoindolin-1-one is thereby produced. 2,7 g of p-phenylenediamine are now added and the mixture is subsequently stirred for 2 hours at room temperature and is then diluted with 100 ml of o-dichlorobenzene. The reaction mixture is heated to 100°C whilst distilling off the methanol and stirring well. After adding a further 100 ml of o-dichlorobenzene and 10 ml of glacial acetic acid the temperature is raised to 140°–150°C and maintained for 2 hours. The insoluble dyestuff is filtered off at 100°C and washed with alcohol, acetone and water. After drying, 15.6 g of a reddish-tinged yellow pigment are obtained, which can be directly incorporated, in this form, into plastics and lacquers. Dyeings which are distinguished by high fastness properties such as, for example, outstanding fastness to migration in PVC or fastness to weathering in lacquers, are obtained.

The tinctorial strength and purity can be improved further if the pigment is brought to a more finely divided form, whereby the transparency is also simultaneously increased. Methods which are particularly suitable for achieving this strongly coloured, pure and transparent form are, for example, alkaline reprecipitation, such as is described in British Pat. No. 1,219,041, and substrate grinding with hexachloroethane, such as is described in DAS 1,209,852.

If, in this example, the 2.7 g of p-phenylene-diamine are replaced by equimolar amounts of the diamines listed in column A in Table I, pigments which display high fastness properties are again obtained. Column B describes the colour in lacquers.

Table I

| Example No. | A<br>Diamines | B<br>Colour |
|---|---|---|
| 5 | 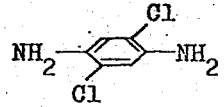 | yellow |
| 6 | 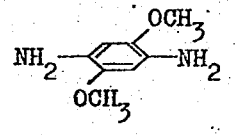 | red-brown |
| 7 | 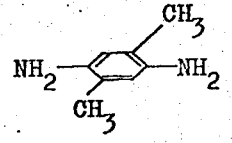 | yellow-orange |
| 8 | 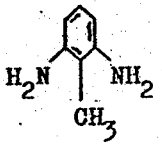 | greenish-tinged yellow |
| 9 | 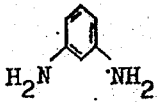 | greenish-tinged yellow |
| 10 | 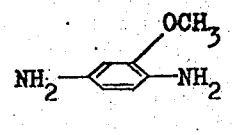 | yellow |

Table I (Continuation)

| Example No. | A<br>Diamines | B<br>Colour |
|---|---|---|
| 11 | NH$_2$—⟨⟩—⟨⟩—NH$_2$ | yellow |
| 12 | 2,2'-diaminobiphenyl (NH$_2$ NH$_2$) | greenish-tinged yellow |
| 13 | NH$_2$—⟨Cl⟩—⟨Cl⟩—NH$_2$ | yellow |
| 14 | NH$_2$—⟨CH$_3$⟩—⟨CH$_3$⟩—NH$_2$ | orange |
| 15 | NH$_2$—⟨OCH$_3$⟩—⟨OCH$_3$⟩—NH$_2$ | red |
| 16 | NH$_2$—⟨⟩—S—⟨⟩—NH$_2$ | yellow-orange |
| 17 | dibenzofuran-diamine (NH$_2$ — O — NH$_2$) | orange |
| 18 | NH$_2$—⟨⟩—NH—CO—⟨⟩—NH$_2$ (with OCH$_3$) | yellow-orange |
| 19 | 1,5-diaminonaphthalene | orange |
| 20 | NH$_2$—⟨⟩—NHCO—⟨⟩—NH$_2$ | yellow |

Table I (Continuation)

| Example No. | A Diamines | B Colour |
|---|---|---|
| 21 | $NH_2$—〔 〕—CH=CH—〔 〕—$NH_2$ | red |
| 22 | $NH_2$—$NH_2$ | greenish-tinged yellow |
| 23 | $NH_2$—N=CH—〔 〕—CH=N—$NH_2$ | greenish-tinged yellow |
| 24 | $NH_2$—[benzothiazole]—[benzothiazole]—$NH_2$ | yellow |
| 25 | $CH_3O$ ... $OCH_3$ <br> $NH_2$—〔 〕—NH—CO—NH—〔 〕—$NH_2$ | brown |
| 26 | $NH_2$—〔 〕—N=N—〔 〕—$NH_2$ <br> $OCH_3$ | orange |
| 27 | $NH_2$—〔 〕—C(=N—$NH_2$)—〔 〕—$CH_3$ | yellow |
| 28 | 〔 〕—N=N—〔 〕($OCH_3$, $NH_2$)—$NH_2$ | orange |
| 29 | $NH_2$—〔 〕—N=N—〔 〕—$NH_2$ <br> $CH_3$ | yellow-orange |

Table I (Continuation)

| Example No. | A Diamines | B Colour |
|---|---|---|
| 30 | (CH₃)₂-C₆H₃-N=N-C₆H₃(OCH₃)(NH₂)-NH₂ | orange |
| 31 | CH₃-C₆H₄-N=N-C₆H₃(OCH₃)(NH₂)-NH₂ | orange |
| 32 | CH₃CONH-C₆H₂(CH₃)₂-N=N-C₆H₃(OCH₃)(NH₂)-NH₂ | reddish-tinged yellow |
| 33 | NH₂-C₆H₄-C₆H₄-C(=N-NH₂)-C₆H₄-Cl | greenish-tinged yellow |
| 34 | Cl-C₆H₄-C(=N-NH₂)-C₆H₄-C₆H₄-C(=N-NH₂)-C₆H₄-Cl | greenish-tinged yellow |
| 35 | NH₂-C₆H₄-C(=N-NH₂)-C₆H₃(Cl)-Cl | reddish-tinged yellow |
| 36 | NH₂-C₆H₄-C(=N-NH₂)-C₆H₄-Cl | reddish-tinged yellow |
| 37 | NH₂-C₆H₄-(indazole-NH₂) | yellow |

Table I (Continuation)

| Example No. | A Diamines | B Colour |
|---|---|---|
| 38 | NH₂–C₆H₄–N(=N)–C₆H₂(NH₂)(Cl) (triazole bridged) | greenish-tinged yellow |
| 39 | CH₃-substituted NH₂–C₆H₃–N(=N)–C₆H₃(CH₃)–NH₂ | yellow |
| 40 | NH₂–C₆H₄–N(=N)–C₆H₃(NH₂)(CH₃) | yellow |
| 41 | CH₃O-substituted NH₂–C₆H₃–N(=N)–C₆H₃(NH₂)(Cl) | yellow |
| 42 | CH₃O-substituted NH₂–C₆H₃–N(=N)–C₆H₃(NH₂)(OCH₃) | yellow |
| 43 | CH₃O-substituted NH₂–C₆H₃–N(=N)–C₆H₃(NH₂)(CH₃) | reddish-tinged yellow |
| 44 | H₂N, OCH₃-substituted C₆H₃–N(=N)–C₆H₃(NH₂)(CH₃) | greenish-tinged yellow |

EXAMPLES 45 to 73

If in Example 4, instead of the 15.5 g of 3,4,6-trichloro-5-methoxy-o-cyanobenzoic acid methyl ester, equimolar amounts of the o-cyanobenzoic acid methyl esters listed in column A of Table II are used and exactly the same procedure is followed, sparingly soluble dyestuffs are again produced. They are suitable for pigmenting plastics and lacquers and show, in PVC, the colour shades described in column B.

Table III shows a number of pigments which were also manufactured according to the instructions of Example 4, but in which both the 3,4,6-trichloro-5-methoxy-o-cyanobenzoic acid methyl ester and the -phenylene-diamine were replaced by equimolar amounts of the o-cyanobenzoic acid esters listed in column A and the diamines listed in cloumn B. The colour shades in PVC films are described in column C.

Table II

| Example No. | A | B Colour |
|---|---|---|
| 45 | 3-ethoxy-2,5,6-trichloro-4-cyano-benzoic acid methyl ester (H₅C₂O, Cl, Cl, CN, COOCH₃, Cl substituents) | yellow |
| 46 | 3-butoxy-2,5,6-trichloro-4-cyano-benzoic acid methyl ester (H₉C₄O substituent) | yellow |
| 47 | 3-(methoxyethoxy)-2,5,6-trichloro-4-cyano-benzoic acid methyl ester (CH₃OH₄C₂O substituent) | yellow |
| 48 | 3-benzyloxy-2,5,6-trichloro-4-cyano-benzoic acid methyl ester (C₆H₅CH₂O substituent) | yellow |
| 49 | 3-ethylthio-2,5,6-trichloro-4-cyano-benzoic acid methyl ester (C₂H₅S substituent) | yellow |
| 50 | 3-(4-chlorophenoxy)-2,5,6-trichloro-4-cyano-benzoic acid methyl ester | reddish-tinged yellow |
| 51 | 3-(4-methylphenoxy)-2,5,6-trichloro-4-cyano-benzoic acid methyl ester | reddish-tinged yellow |

Table II (Continuation)

| Example No. | A | B Colour |
|---|---|---|
| 52 | 2,4-dichlorophenoxy attached to benzene ring with Cl, Cl, CN, COOCH₃, Cl substituents | reddish-tinged yellow |
| 53 | 2,6-dimethylphenoxy attached to benzene ring with Cl, Cl, CN, COOCH₃, Cl substituents | yellow |
| 54 | 4-nitrophenoxy ($O_2N$-C$_6$H$_4$-O-) attached to benzene ring with Cl, Cl, CN, COOCH₃, Cl substituents | reddish-tinged yellow |
| 55 | 4-methoxyphenoxy ($CH_3O$-C$_6$H$_4$-O-) attached to benzene ring with Cl, Cl, CN, COOCH₃, Cl substituents | yellow-orange |
| 56 | 3-trifluoromethylphenoxy ($CF_3$-C$_6$H$_4$-O-) attached to benzene ring with Cl, Cl, CN, COOCH₃, Cl substituents | yellow |
| 57 | 2-naphthyloxy attached to benzene ring with Cl, Cl, CN, COOCH₃, Cl substituents | yellow |
| 58 | benzene ring with $OCH_3$, Cl, CN, COOCH₃, Cl, $CH_3O$ substituents | greenish-tinged yellow |

Table II (Continuation)
| Example No. | A | B Colour |
|---|---|---|
| 59 | 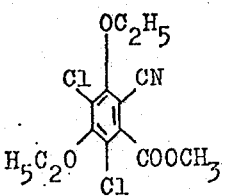 | greenish-tinged yellow |
| 60 | 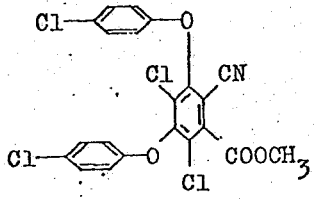 | yellow |
| 61 | 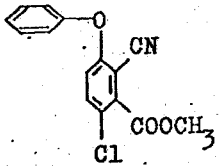 | yellow |
| 62 | 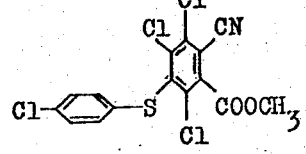 | orange |
| 63 | 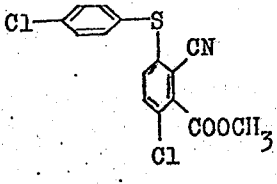 | orange |
| 64 | 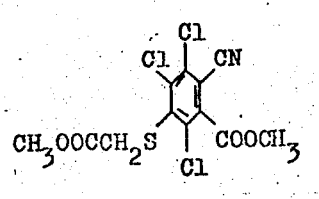 | yellow |

Table II (Continuation)

| Example No. | A | B Colour |
|---|---|---|
| 65 | phenyl–O–(CH)₃–S-substituted benzene with Cl, Cl, CN, COOCH₃, Cl substituents | yellow |
| 66 | H₇C₃O-substituted benzene with Cl, Cl, CN, COOCH₃, Cl substituents | yellow |
| 67 | CH₃O-substituted benzene with Br, Br, CN, COOCH₃, Cl substituents | yellow |
| 68 | phenyl–O-substituted benzene with Br, Br, CN, COOCH₃, Br substituents | yellow |

Table III

| Example No. | A | B | C |
|---|---|---|---|
| 69 | H₅C₂O-substituted benzene with Cl, Cl, CN, COOC₂H₅, Cl substituents | 1,5-diaminonaphthalene (NH₂, NH₂) | orange |

Table III (Continuation)

| Example No. | A | B | C |
|---|---|---|---|
| 70 | 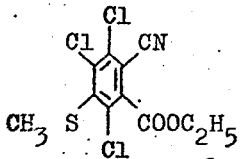 | 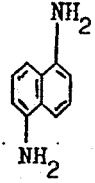 | orange |
| 71 | 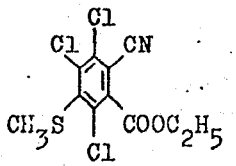 | 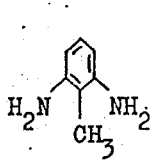 | yellow |
| 72 | 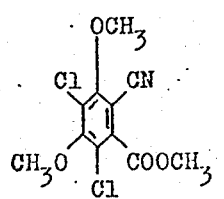 | 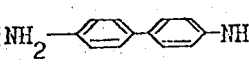 | orange |
| 73 | 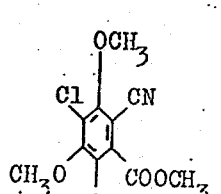 | 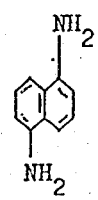 | orange |

EXAMPLE 74

Mixed synthesis. If in Example 4, instead of the 15.5 of 3,4,6-trichloro-5-methoxy-o-cyanobenzoic acid methyl ester a mixture of 7.75 g of this ester and 9.4 g of 3,4,6-trichloro-5-phenoxy-o-cyanobenzoic acid methyl ester is used and exactly the same procedure is followed, a yellow pigment is obtained which is suitable for pigmenting plastics and lacquers.

EXAMPLE 75

If in the preceding example the 9.4 g of 3,4,6-trichloro-5-phenoxy-o-cyanobenzoic acid methyl ester are replaced by 7.9 g of 3,4,5,6-tetrachloro-o-cyanobenzoic acid methyl ester, a yellow pigment which displays high fastness properties is again produced.

EXAMPLE 76

2 g of the pigment manufactured according to Example 1 are mixed and ground on a triple-roll mill with 36 g of hydrated alumina, 60 g of linseed oil varnish of medium viscosity and 0.2 g of cobalt linoleate. The yellow-orange prints produced with this colour paste are distinguished by outstanding fastness to light.

EXAMPLE 77

0.6 g of the pigment manufactured according to Example 4 is mixed with 67 g of polyvinyl chloride, 33 g of dioctyl phthalate, 2 g of dibutyl-tin dilaurate and 2 g of titanium dioxide and the mixture is milled for 15 minutes on a triple-roll mill. The colour of the yellow polyvinyl chloride films produced therewith is fast to migration, heat and light.

EXAMPLE 78

10 g of titanium oxide and 2 g of the pigment manufactured according to Example 4 and listed under 14 in the table are ground with 88 g of a mixture of 26.4 g of coconut alkyd resin, 24.0 g of melamine-formaldehyde resin (50% solids content), 8,8 g of ethylene glycol monomethyl ether and 28.8 of xylene for 48 hours in a ball mill.

If this lacquer is sprayed onto an aluminium foil, pre-dried for 30 minutes at room temperature and subsequently stoved for 30 minutes at 120°C, an orange lacquering which is distinguished by very good fastness to overlacquering, light and weathering is obtained.

We claim:

1. An isoindolinone pigment of the formula

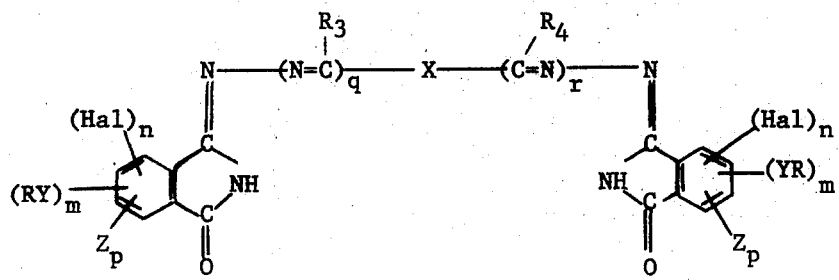

wherein Hal denotes chlorine or bromine, X denotes a direct bond, a carbocyclic radical selected from the group consisting of naphthylene, or a group having the formula

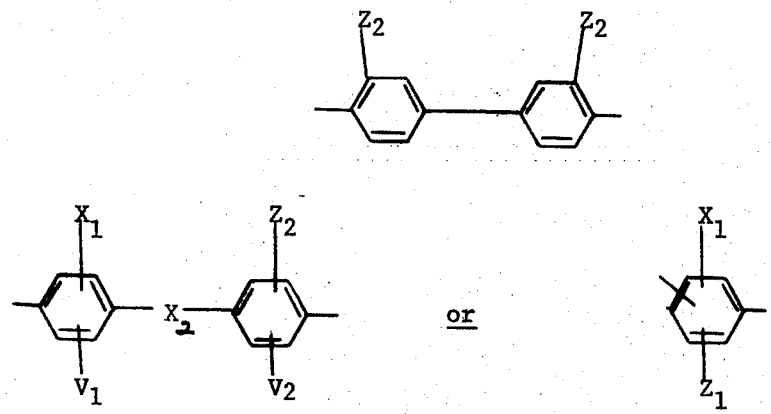

wherein $X_1$, $V_1$, $V_2$ and $Z_2$ denote hydrogen, halogen, alkyl of 1 to 4 carbon atoms, alkoxy of 1 to 4 carbon atoms, $X_2$ denotes sulphur, —NH—CO—, —NH—CO—NH—, —CH=CH— or —N=N—, $Z_1$ is halogen, alkyl of 1 to 4 carbon atoms, alkoxy of 1 to 4 carbon atoms, phenylazo, phenylazo substituted with methyl or acetylamino, or a heterocyclic aromatic radical, selected from the group consisting of

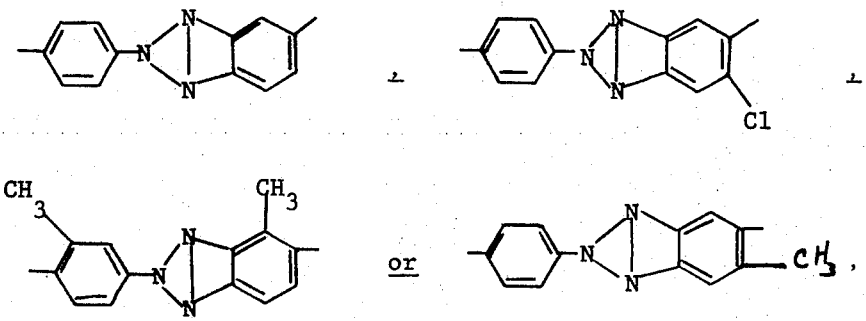

Y denotes oxygen or sulphur, $R_3$ and $R_4$ denote hydrogen, lower alkyl or an aryl radical selected from the group consisting of chlorophenyl, or dichlorophenyl, and R denotes hydrogen, lower alkyl, lower cycloalkyl, benzyl or aryl selected from the group consisting of phenyl, chlorophenyl, methylphenyl, dichlorophenyl, dimethyl-phenyl, methoxyphenyl or naphthyl, Z denotes hydorgen, $n$ denotes the number 0 to 3, $m$ denotes the number 1 to 4, $p$ denotes the number 0 to 2 and $q$ and $r$ denote the numbers 0 or 1, with the sum of $n+m+p$ being at most 4.

2. An isoindolinone pigment according to claim 1, of the formula

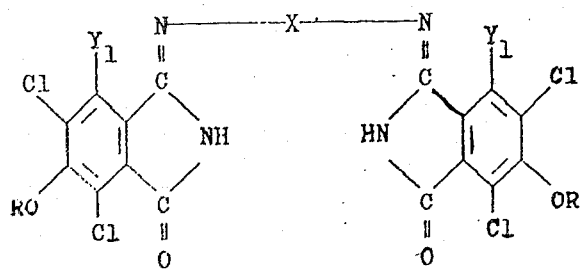

wherein $Y_1$ denotes chlorine or the —OR group and R and X have the indicated meaning.

3. An isoindolinone pigment according to claim 2, of the formula

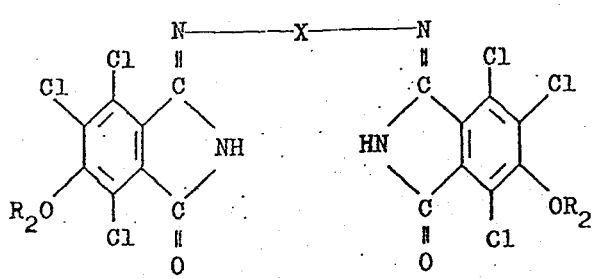

wherein X has the indicated meaning and $R_2$ denotes alkyl containing 1 to 4 carbon atoms.

4. An isoindolinone pigment according to claim 2, of the formula

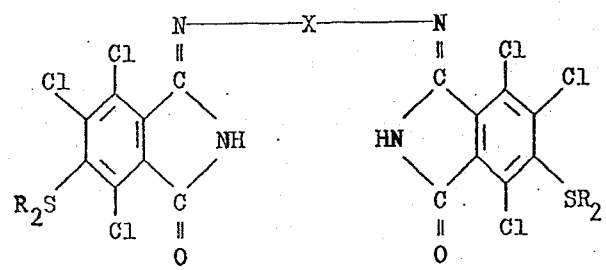

wherein X and R have the indicated meaning.

5. The isoindolinone pigment according to claim 1 wherein X denotes the radical of the formula

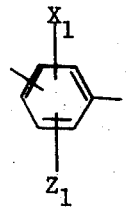

wherein $X_1$ denotes hydrogen or halogen or alkyl containing from 1 to 4 carbon atoms or alkoxy containing 1 to 4 carbon atoms and $Z_1$ denotes alkyl containing from 1 to 4 carbon atoms, alkoxy containing 1 to 4 carbon atoms, phenylazo, phenylazo substituted by methyl or acetylamino.

6. The compound according to claim 2 of the formula

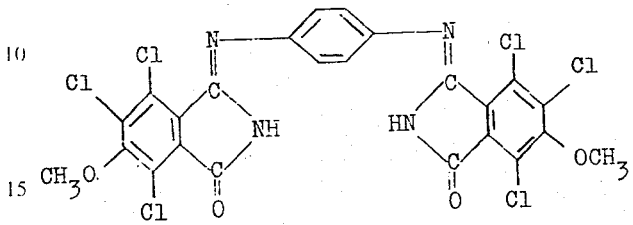

7. The compound according to claim 2 of the formula

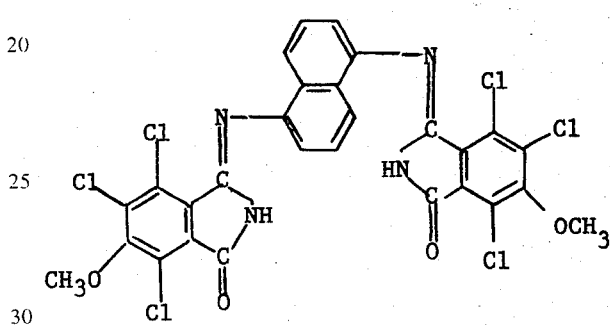

8. The compound according to claim 2 of the formula

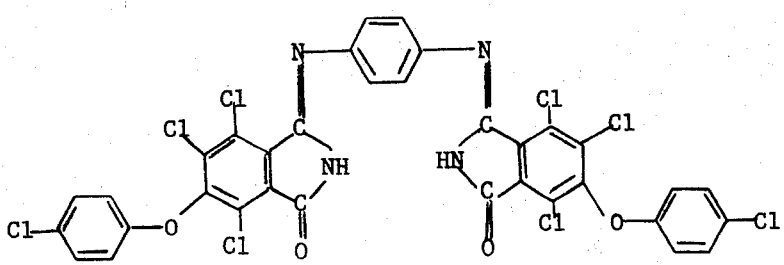

9. The compound according to claim 2 of the formula

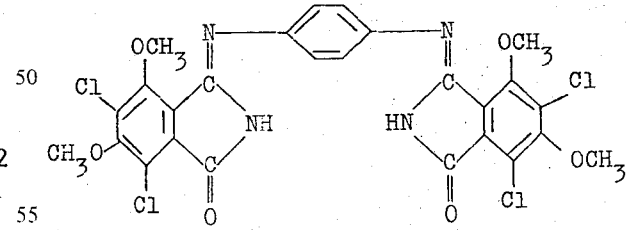

10. The compound according to claim 2 of the formula

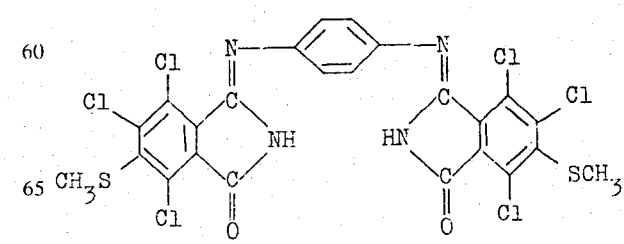

* * * * *